(12) United States Patent
Gazetov et al.

(10) Patent No.: US 9,064,236 B2
(45) Date of Patent: Jun. 23, 2015

(54) BUSINESS METHOD FOR AGGREGATION AND PRESENTATION OF THE MEDIA DATA

(75) Inventors: Rafael Gazetov, Visaginas (LT); Anton Sasok, Visaginas (LT); Vitalij Gluscenko, Visaginas (LT)

(73) Assignee: TVonFly Solutions LLP, Chelmsford (GB)

( * ) Notice: Subject to any disclaimer, the term of this patent is extended or adjusted under 35 U.S.C. 154(b) by 442 days.

(21) Appl. No.: 13/019,502

(22) Filed: Feb. 2, 2011

(65) Prior Publication Data

US 2012/0198565 A1 Aug. 2, 2012

(51) Int. Cl.
| | |
|---|---|
| *H04L 29/06* | (2006.01) |
| *G06Q 10/10* | (2012.01) |
| *G06Q 50/00* | (2012.01) |

(52) U.S. Cl.
CPC .............. *G06Q 10/101* (2013.01); *G06Q 50/01* (2013.01)

(58) Field of Classification Search
CPC ....... H04L 63/10; G06Q 50/01; G06Q 10/101
USPC .................................. 726/2–5; 709/217–219
See application file for complete search history.

(56) References Cited

U.S. PATENT DOCUMENTS

| | | | |
|---|---|---|---|
| 6,934,690 | B1 | 8/2005 | Van Horn et al. |
| 7,707,246 | B1 * | 4/2010 | Issa et al. ....................... 709/204 |
| 7,783,767 | B2 * | 8/2010 | Collazo .......................... 709/229 |
| 7,970,665 | B1 * | 6/2011 | Lifson ........................... 705/26.7 |
| 8,245,273 | B2 * | 8/2012 | Carr et al. ......................... 726/1 |
| 8,458,265 | B1 * | 6/2013 | Gailloux et al. .............. 709/206 |

| | | | |
|---|---|---|---|
| 2001/0042003 | A1 | 11/2001 | Tanaka |
| 2002/0128848 | A1 | 9/2002 | Wheelock |
| 2003/0088520 | A1 | 5/2003 | Bohrer et al. |
| 2004/0034539 | A1 | 2/2004 | Zitler et al. |
| 2005/0246233 | A1 | 11/2005 | Estruth et al. |
| 2005/0256844 | A1 | 11/2005 | Cristol |
| 2006/0053060 | A1 | 3/2006 | Wyker |

(Continued)

OTHER PUBLICATIONS

Lerman; Social Information Processing in News Aggregation; Published in: Internet Computing, IEEE (vol. 11 , Issue: 6; pp. 16-28; Date of Publication : Nov.-Dec. 2007; IEEE Xplore.*

(Continued)

*Primary Examiner* — Bradley Holder
(74) *Attorney, Agent, or Firm* — Young & Thompson

(57) ABSTRACT

A method for aggregation and presentation of media data, includes the following steps: launching the application registered for interacting with internet community; authorizing the application in the external systems of the internet community using external Application Programming Interfaces; obtaining the permit from a media data keeper to access his/her media data in the internet community; retrieving the media data from the internet community through the application registered in that particular internet community to allow both the media data keeper and the registered application to access and use the aggregated data; selecting potentially presentable (supported) media data from the previously formed media data bank; presenting a series of the aggregated media data to an individual or corporate user (the recipient). The aggregation and presentation of the media data from the internet community is implemented through computer or telecommunication systems that provide the functioning of the application which obtains media data from various sources, aggregates it, filters, identifies the possibility of presenting the particular media data, sorts it out and implements its presentation.

10 Claims, 1 Drawing Sheet

(56) References Cited

U.S. PATENT DOCUMENTS

| | | |
|---|---|---|
| 2006/0178976 A1 | 8/2006 | Vu |
| 2006/0179112 A1 | 8/2006 | Weyer et al. |
| 2007/0169165 A1* | 7/2007 | Crull et al. .................. 725/135 |
| 2008/0013701 A1* | 1/2008 | Barhydt et al. ............ 379/92.02 |
| 2009/0144392 A1* | 6/2009 | Wang et al. .................. 709/217 |
| 2009/0150786 A1* | 6/2009 | Brown .......................... 715/733 |
| 2009/0292814 A1* | 11/2009 | Ting et al. .................... 709/229 |
| 2009/0327437 A1* | 12/2009 | Estrada ........................ 709/206 |
| 2010/0063873 A1* | 3/2010 | McGucken .................. 705/14.4 |
| 2010/0082727 A1* | 4/2010 | Zalewski ..................... 709/201 |
| 2010/0106730 A1* | 4/2010 | Aminian et al. ............. 707/748 |
| 2010/0228617 A1* | 9/2010 | Ransom et al. ............ 705/14.25 |
| 2010/0250424 A1* | 9/2010 | Torres ............................ 705/37 |
| 2010/0324981 A1* | 12/2010 | Etchegoyen ............... 705/14.16 |
| 2010/0333131 A1* | 12/2010 | Parker et al. .................... 725/31 |
| 2011/0022669 A1* | 1/2011 | Pascoe et al. ................. 709/206 |
| 2011/0061108 A1* | 3/2011 | Arrasvuori et al. ............. 726/27 |
| 2011/0069661 A1* | 3/2011 | Waytena et al. ............. 370/328 |
| 2011/0107185 A1* | 5/2011 | Grube et al. .................. 714/768 |
| 2012/0110064 A1* | 5/2012 | Chen et al. ................... 709/203 |

OTHER PUBLICATIONS

Tanaka et al.; A framework for spatial interaction in locative media; Published in: Proceeding NIME '06 Proceedings of the 2006 conference on New interfaces for musical expression; pp. 26-30; 2006; ACM Digital Library.*

* cited by examiner

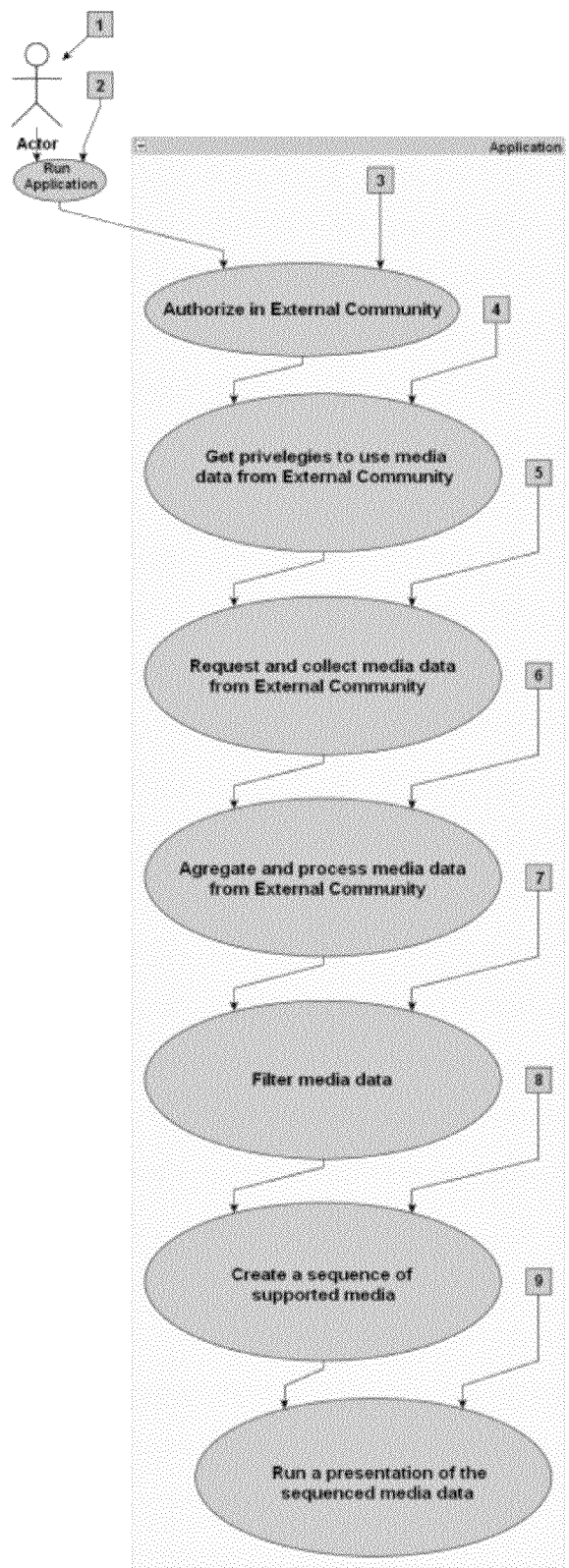

BUSINESS METHOD FOR AGGREGATION AND PRESENTATION OF THE MEDIA DATA

The process of aggregation and presentation of the media data from the internet community is implemented through computer or telecommunication systems that provide the functioning of the Application which obtains media data from various sources, aggregates it, filters, identifies the possibility of presenting the particular media data, sorts it out and implements its presentation.

DESCRIPTION OF THE INVENTION

1. Areas of Application

The presented invention could be widely used in various areas or spheres of human activity, in particular, in all internet community groups such as business, science, sport, art, culture, music and many others.

2. Background

There is hardly any need in the media data used nowadays in the majority of social networks, blogs or microblogs to be arranged. However, what is really needed is to find a method of accessing and processing this data by its users in a most efficient way. All the news, messages, video clips or any other types of data created by users or third parties could be presented as a specially structured progression of automatic visualizations, which would allow its recipients to access and process the target information in a much more efficient way by significantly reducing the time on such routine computer operations as clicking, filtering, browsing web pages, adjusting the quality or on any similar time-consuming actions.

SUMMARY OF THE INVENTION

The Application presented by this invention aggregates the media data from various sources, such as media data feeds belonging to users, their friends or their internet communities, filters the media data, then sorts it out in a particular sequence and, finally, automatically presents the series of target media data as a visualized progression, without users' further interference.

In the presented invention, the process of aggregation and presentation of media data is implemented in the following way:
04.1 Opening the Application registered for interacting with particular internet communities such as a social network, network groups, blogs or microblogs.
04.2 Authorizing the Application in the external system of the internet community using existing API.
04.3 Obtaining a permit from a selected media data keeper to access his/her media data in the internet community.
04.4 Retrieving the media data from the internet community through the Application registered in that particular internet community to allow both the media data keeper and the registered Application to access and use the aggregated data.
04.5 Selecting media data supported by the Application from the previously formed media data bank.
04.6 Presenting a series of aggregated media data to an individual or corporate user/the recipient.

In the presented invention, the process of aggregation of media data is implemented by:
05.1 Retrieving the media data from the internet community after having obtained the permission from the media data keeper or the community.
05.2 Sorting out the variety of the retrieved media data.
05.3 Filtering the media data, for example, by the recipient's age.

In the presented invention, the internal algorithm of the Application makes a decision of selecting—either including or excluding—and sorting out the media data in a particular sequence by its automatic processing. If, while working with a particular internet community, it is possible to acquire the media data keeper's internal contacts with other users of that internet community, the Application is able to obtain the media data of the third parties, providing the latter give their permission to perform such actions.

In the presented invention, the presentation of the target media data, which had been selected in the process of aggregation, to its recipient is implemented in such a way that there is no need for the recipient to perform such actions as searching for, retrieving or arranging this media data.

A BRIEF DESCRIPTION OF THE DRAWING

FIG. 1 is a diagram illustrating the main operation stages of the Application.

A DESCRIPTION OF THE PREFERRED EMBODIMENT

Next, the embodiment of the presented invention—the business method of aggregation and presentation of media data, —illustrated in the accompanying drawing (FIG. 1), will be described.

FIG. 1 is a diagram illustrating the main operation stages of the Application where the actor (it), firstly, launches [1] and runs [2] the Application on at least one processor. After being authorized [3] in the external community (for example, social networks, blogs or microblogs), the application obtains a permit [4] to use the particular media data from the external community by using one or more processors. Then the application run on the at least one processor retrieves [5] the media data from the external community, aggregates [6] and processes it by its filtering [7] to create [8] a progression of supported media data. Finally, it runs [9] the visualized presentation of the sequenced media data on a computing device including a display.

CONCLUSION

The core of the presented invention is a newly developed Application that aggregates media data from various sources, such as media data feeds belonging to individual users, their friends or their internet communities, filters it, then sorts out the filtered media data in a particular sequence and automatically presents (demonstrates) the series of target media data as a visualized progression, without users' further interference.

In the presented invention, the created Application allows its user (an individual or the internet community):
12.1 To create and generate virtual media channels using as their basis the media data from individual or corporate users or the internet communities they belong to;
12.2 To create their own video channels within the internet community;
12.3 To create their own commercials using as their basis the media data obtained from other individual or corporate internet users;
12.4 To automatically view the latest video clips, news and comments on the same screen, without wasting any extra time on searching for the target media data on the computer or any other telecommunication systems;

12.5 To be aware of the latest news and be constantly informed of the clips in the video data tape, being able to automatically access and view them.

EXAMPLE

To illustrate the employing of the Application and the business method described above, the authors developed the IT Application TvOnFly© which is located at http://tvonfly.com and could be used as an example.

The process of operating the created Application TvOnFly© and applying the algorithm of the suggested business method is described in the case-study below.

The user opens the Application web page http://tvonfly.com. He/She is informed that the Application could only present media data from his/her account on the FaceBook social network. He/She is also informed that the information about either the user or the media data content will not be used for any other but a presentation purpose.

At the initial stage of operating the TvOnFly© Application, its user is required to have a registered account with the Facebook and to grant his permission for retrieving the media data from its feed. In case the user has no account, he is offered to register with the Facebook and open one. If he/she refuses to grant his/her permission to TvOnFly©, the latter closes down. The Application TvOnFly© is created using open-source technologies, such as HTML, JavaScript and jQuery, therefore, its user is guaranteed confidentiality and protection of any information obtained while operating the Application. The FaceBook API allows any applications registered in its catalogue of checked applications to obtain the data from the Facebook network, providing its user, or a group of users, granted their permission, though with certain restrictions.

The user is authorized in the Facebook social network through the TvOnFly© Application. However, the latter, in its turn, does not use the authorized data, but just retrieves the FaceBook authorization interface. Once the authorization is completed and the permission to retrieve the FaceBook user's media content is received successfully, the TvOnFly© Application requests the FaceBook network to retrieve its media data, depending on the type of the order the user sends:

17.1 Order Type 1: to view the video clips added by the media data keeper, his friends and any communities the access to the media data of which has no restrictions.
17.2 Order Type 2: to view the video clips added by the media data keeper only.
17.3 Order Type 3: to view the video clips existing on the FaceBook social network If at least one video clip is submitted as a result of the request, one of the following types of video players, based on the flash technology, is launched:

18.1 Videoplayer Type 1: YouTube chromeless, which allows playing video clips from the video hosting YouTube.
18.2 Videoplayer Type 2: TvofPlayer, which has JavaScript API interface, similar to the YouTube player API, and which is used to play those video clips that have direct links for downloading.

In case no video clips are submitted as a result of the first request, the TvOnFly© Application closes down.

The retrieved video clips are collected in the playlist which could be restricted to a certain number of video links, for example, 10. After all the first 10 video clips have been played, the TvOnFly© Application sends a request for 10 more video clips. In case, no new clips are received, the TvOnFly© Application repeats the initial order.

The TvOnFly© Application also allows to view the latest comments to a particular video clip while it is being played.

The TvOnFly© Application allows to follow the latest 5 additions from its FaceBook feed as a news line. By clicking on a particular piece of news, the user can open its corresponding web page on the Facebook network.

The TvOnFly© Application does not allow its user to switch between the video clips while one of them is being played. However, the user has an opportunity of adding a comment to that particular video clip informing the TvOnFly Application that this video clip is blocked for future viewing in the TvOnFly© Application. This command is performed by a set of the following actions:

22.1 to click the 'playlist' button;
22.2 to select from the playlist the video clip prohibited for future viewing;
22.3 to click on the selected video clip, after which a window will appear with the button 'remove from TvOnFly©;
22.4 to click the button 'remove from TvOnFly©, after which the message will be automatically added to that video clip about its prohibition.

In case the unwanted video clip is blocked while being viewed, its viewing will be interrupted and the TvOnFly Application will switch to playing the next clip in the playlist.

the video players involved in the process of viewing have no media controls to allow the user to change the sequence of the video content. The user can only regulate the sound volume by operating a certain switch.

In this way, the TvOnFly© Application allows its user to automatically view the latest video clips, news and comments on the same screen while freeing him/her from performing any traditional computer operating routines. At the same time, the user is given an opportunity to access all the latest data in the media data tape and switch to its viewing when required.

Forming media communities within the FaceBook network would allow those communities to quickly create their own media channels at http://tvonfly.com, which would further expand their opportunities for developing communication, education and solving any tasks vital for those media communities.

The invention claimed is:
1. A method for aggregation and presentation of media data, the method comprising:
launching an application on a processor, the application being registered for interacting with a social network community;
authorizing the application in external systems of the social network community using external application programming interfaces (API);
requesting, through the application, a permit to access a user account for a user in the social network community to access media data previously-obtained and associated with the user account in the social network community;
obtaining the permit to access the media data through the user account in the social network community;
retrieving the media data from the user account in the social network community through the application registered in the social network community to allow both the user and the registered application to access and use the retrieved media data, in response to a request through the application to retrieve the media data associated with the user account from the social network community, the retrieved media data including one or more of first media data particularly associated with the user and one or more second media data associated with one or more other entities related to the user within the external network community;

selecting potentially presentable media data from a previously formed media data bank formed using the retrieved media data; and presenting a specific series of media data from the selected potentially presentable media data.

2. A non-transitory computer-readable medium containing instructions that when executed cause a computer to execute a method for aggregating and presenting media data, the method comprising:

launching an application on a processor, the application being registered for interacting with a social network community;

authorizing the application in external systems of the social network community using external application programming interfaces (API);

requesting, through the application, a permit to access a user account for a user in the social network community to access media data previously-obtained and associated with the user account in the social network community;

obtaining the permit to access the media data through the user account in the social network community;

retrieving the media data from the user account in the social network community through the application registered in the social network community to allow both the user and the registered application to access and use the retrieved media data, in response to a request through the application to retrieve the media data associated with the user account from the social network community, the retrieved media data including one or more of first media data particularly associated with the user and one or more second media data associated with one or more other entities related to the user within the external network community;

selecting potentially presentable media data from a previously formed media data bank formed using the retrieved media data; and presenting a specific series of media data from the selected potentially presentable media data.

3. A method for aggregating and presenting media data, the method comprising:

launching an application on a processor, the application being registered for interacting with an external social network community;

authorizing the launched application in an external system of the external social network community using an external application programming interface;

requesting, through the application, a permit to access a user account for a user in the social network community to access media data previously-obtained and associated with the user account in the external social network community;

obtaining the permit to use the media data through the user account in the external social network community to access the media data;

retrieving the media data from the user account in the external social network community through the application registered in the social network community to allow both the user and the registered application to access and use the retrieved media data, in response to a request through the application to retrieve the media data associated with the user account from the external social network community, the retrieved media data including one or more of first media data particularly associated with the user and one or more second media data associated with one or more other entities related to the user within the external network community;

filtering the retrieved media data to obtain filtered media data by excluding a portion of the retrieved media data; and sorting the filtered media data to form a presentation sequence of media data.

4. The method according to claim 3, further comprising visually presenting the presentation sequence of media data on a display.

5. The method according to claim 3, wherein the one or more other entities include one or more contacts of the user in the external social network community, and the second media data includes media data particularly associated with the contacts of the user in the external social network community.

6. The method according to claim 5, further comprising obtaining another permit from the one or more contacts of the user in order to retrieve the second media data.

7. The method according to claim 3, wherein the one or more entities include the external social network community, and the second media data includes media data associated with all users of the external social network community.

8. The method according to claim 3, further comprising:
retrieving the first media data and the second media data; and
aggregating the retrieved first media data and second media data.

9. The method according to claim 3, wherein the permit is obtained from the user.

10. The method according to claim 3, wherein the permit is obtained from the external social network community.

* * * * *